(12) United States Patent
Mandeyam et al.

(10) Patent No.: US 12,200,008 B2
(45) Date of Patent: Jan. 14, 2025

(54) SECURITY AWARE LOAD BALANCING FOR A GLOBAL SERVER LOAD BALANCING SYSTEM

(71) Applicant: VMware LLC, Palo Alto, CA (US)

(72) Inventors: Narasimhan Gomatam Mandeyam, San Jose, CA (US); Sambit Kumar Das, Hayward, CA (US); Shyam Sundar Govindaraj, Santa Clara, CA (US)

(73) Assignee: VMware LLC, Palo Alto, CA (US)

( * ) Notice: Subject to any disclaimer, the term of this patent is extended or adjusted under 35 U.S.C. 154(b) by 447 days.

(21) Appl. No.: 17/381,001

(22) Filed: Jul. 20, 2021

(65) Prior Publication Data

US 2023/0025679 A1    Jan. 26, 2023

(51) Int. Cl.
*H04L 9/40* (2022.01)
*H04L 61/4511* (2022.01)

(52) U.S. Cl.
CPC ...... *H04L 63/1458* (2013.01); *H04L 61/4511* (2022.05); *H04L 63/1466* (2013.01)

(58) Field of Classification Search
CPC ............. H04L 63/1458; H04L 61/4511; H04L 63/1466
See application file for complete search history.

(56) References Cited

U.S. PATENT DOCUMENTS

| | | | |
|---|---|---|---|
| RE4,814 E | 3/1872 | Madurell | |
| 5,109,486 A | 4/1992 | Seymour | |
| 5,781,703 A | 7/1998 | Desai et al. | |
| 6,148,335 A | 11/2000 | Haggard et al. | |
| 6,449,739 B1 | 9/2002 | Landan | |
| 6,515,968 B1 | 2/2003 | Combar et al. | |
| 6,714,979 B1 | 3/2004 | Brandt et al. | |
| 6,754,706 B1 | 6/2004 | Swildens et al. | |
| 6,792,458 B1 | 9/2004 | Muret et al. | |
| 6,792,460 B2 | 9/2004 | Oulu et al. | |

(Continued)

FOREIGN PATENT DOCUMENTS

| | | |
|---|---|---|
| AU | 2011352884 A1 | 7/2013 |
| CA | 2607005 C | 2/2012 |
| WO | 2020086956 A1 | 4/2020 |

OTHER PUBLICATIONS

Non-Published commonly Owned U.S. Appl. No. 18/102,696, filed Jan. 28, 2023, 40 pages, VMware, Inc.

(Continued)

*Primary Examiner* — Stephen T Gundry
(74) *Attorney, Agent, or Firm* — Quarles & Brady LLP

(57) ABSTRACT

The method of some embodiments assigns a client to a particular datacenter from among multiple datacenters. The method is performed at a first datacenter, starting when it receives security data associated with a second datacenter. Then the method receives a DNS request from the client. Based on the received security data, the method sends a DNS reply assigning the client to the particular datacenter instead of the second datacenter. The receiving and sending is performed by a DNS cluster of the datacenter in some embodiments. The particular datacenter includes a set of servers implementing an application for the client in some embodiments. The datacenter to which the client gets assigned can be the first datacenter or a third datacenter.

20 Claims, 7 Drawing Sheets

(56) References Cited

U.S. PATENT DOCUMENTS

| | | | |
|---|---|---|---|
| 6,901,051 B1 | 5/2005 | Hou et al. |
| 6,976,090 B2 | 12/2005 | Ben-Shaul et al. |
| 6,996,778 B2 | 2/2006 | Rajarajan et al. |
| 7,076,695 B2 | 7/2006 | McGee et al. |
| 7,130,812 B1 | 10/2006 | Iyer et al. |
| 7,246,159 B2 | 7/2007 | Aggarwal et al. |
| 7,353,272 B2 | 4/2008 | Robertson et al. |
| 7,430,610 B2 | 9/2008 | Pace et al. |
| 7,636,708 B2 | 12/2009 | Garcea et al. |
| 7,701,852 B1 | 4/2010 | Hohn et al. |
| 7,743,380 B2 | 6/2010 | Seidman et al. |
| 7,933,988 B2 | 4/2011 | Nasuto et al. |
| 7,990,847 B1 | 8/2011 | Leroy et al. |
| 8,032,896 B1 | 10/2011 | Li et al. |
| 8,112,471 B2 | 2/2012 | Wei et al. |
| 8,131,712 B1 | 3/2012 | Thambidorai et al. |
| 8,412,493 B2 | 4/2013 | Duchenay et al. |
| 8,499,066 B1 | 7/2013 | Zhang et al. |
| 8,588,069 B2 | 11/2013 | Todd et al. |
| 8,856,797 B1 | 10/2014 | Siddiqui et al. |
| 8,874,725 B1 | 10/2014 | Ganjam et al. |
| 8,977,728 B1 | 3/2015 | Martini |
| 9,032,078 B2 | 5/2015 | Beerse et al. |
| 9,047,648 B1 | 6/2015 | Lekutai et al. |
| 9,071,537 B2 | 6/2015 | Talla et al. |
| 9,083,710 B1 | 7/2015 | Yadav |
| 9,210,056 B1 | 12/2015 | Choudhary et al. |
| 9,256,452 B1 | 2/2016 | Suryanarayanan et al. |
| 9,288,193 B1 | 3/2016 | Gryb et al. |
| 9,300,552 B2 | 3/2016 | Dube et al. |
| 9,300,553 B2 | 3/2016 | Dube et al. |
| 9,319,343 B2 | 4/2016 | Khandelwal et al. |
| 9,329,915 B1 | 5/2016 | Chandrasekharapuram et al. |
| 9,450,700 B1 | 9/2016 | Tonder et al. |
| 9,459,980 B1 | 10/2016 | Arguelles |
| 9,467,476 B1 | 10/2016 | Shieh et al. |
| 9,477,784 B1 | 10/2016 | Bhave et al. |
| 9,483,286 B2 | 11/2016 | Basavaiah et al. |
| 9,491,164 B1 | 11/2016 | Fay et al. |
| 9,495,222 B1 | 11/2016 | Jackson |
| 9,531,614 B1 | 12/2016 | Nataraj et al. |
| 9,535,805 B2 | 1/2017 | Ananthanarayanan et al. |
| 9,558,465 B1 | 1/2017 | Arguelles et al. |
| 9,571,516 B1 | 2/2017 | Curcic et al. |
| 9,608,880 B1 | 3/2017 | Goodall |
| 9,613,120 B1 | 4/2017 | Kharatishvili et al. |
| 9,626,275 B1 | 4/2017 | Hitchcock et al. |
| 9,674,302 B1 | 6/2017 | Khalid et al. |
| 9,680,699 B2 | 6/2017 | Cohen et al. |
| 9,692,811 B1 | 6/2017 | Tajuddin et al. |
| 9,697,316 B1 | 7/2017 | Taylor et al. |
| 9,712,410 B1 | 7/2017 | Char et al. |
| 9,716,617 B1 | 7/2017 | Ahuja et al. |
| 9,729,414 B1 | 8/2017 | Oliveira et al. |
| 9,749,888 B1 | 8/2017 | Colwell et al. |
| 9,798,883 B1 | 10/2017 | Gil et al. |
| 9,817,699 B2 | 11/2017 | Stich et al. |
| 9,830,192 B1 | 11/2017 | Crouchman et al. |
| 9,882,830 B2 | 1/2018 | Taylor et al. |
| 9,935,829 B1 | 4/2018 | Miller et al. |
| 9,959,188 B1 | 5/2018 | Krishnan |
| 9,967,275 B1 | 5/2018 | Kolman et al. |
| 9,979,617 B1 | 5/2018 | Meyer et al. |
| 10,003,550 B1 | 6/2018 | Babcock et al. |
| 10,015,094 B1 | 7/2018 | Akers et al. |
| 10,127,097 B2 | 11/2018 | Talla et al. |
| 10,148,631 B1* | 12/2018 | Sokolov ............ H04W 12/65 |
| 10,212,041 B1 | 2/2019 | Rastogi et al. |
| 10,237,135 B1 | 3/2019 | Alabsi et al. |
| 10,313,211 B1 | 6/2019 | Rastogi et al. |
| 10,372,600 B2 | 8/2019 | Mathur |
| 10,547,521 B1 | 1/2020 | Roy et al. |
| 10,594,562 B1 | 3/2020 | Rastogi et al. |
| 10,630,543 B1 | 4/2020 | Wei et al. |
| 10,693,734 B2 | 6/2020 | Rastogi et al. |
| 10,728,121 B1 | 7/2020 | Chitalia et al. |
| 10,873,541 B2 | 12/2020 | Callau et al. |
| 10,931,548 B1 | 2/2021 | Iyer et al. |
| 10,999,168 B1 | 5/2021 | Gupta et al. |
| 11,038,839 B1 | 6/2021 | Vettaikaran et al. |
| 11,038,840 B1 | 6/2021 | Vettaikaran et al. |
| 11,044,180 B2 | 6/2021 | Rastogi et al. |
| 11,171,849 B2 | 11/2021 | Rastogi et al. |
| 11,283,697 B1 | 3/2022 | Rajagopalan et al. |
| 11,290,358 B2 | 3/2022 | Basavaiah et al. |
| 11,411,825 B2 | 8/2022 | Rastogi et al. |
| 11,513,844 B1 | 11/2022 | Aleti et al. |
| 11,582,120 B2 | 2/2023 | Basavaiah et al. |
| 11,736,372 B2 | 8/2023 | Rastogi et al. |
| 11,765,046 B1* | 9/2023 | Zeng ................ H04L 41/0893 |
| | | 709/223 |
| 2002/0078150 A1 | 6/2002 | Thompson et al. |
| 2002/0198984 A1 | 12/2002 | Goldstein et al. |
| 2002/0198985 A1 | 12/2002 | Fraenkel et al. |
| 2003/0191837 A1 | 10/2003 | Chen |
| 2003/0236877 A1 | 12/2003 | Allan |
| 2004/0054680 A1 | 3/2004 | Kelley et al. |
| 2004/0064552 A1 | 4/2004 | Chong et al. |
| 2004/0103186 A1 | 5/2004 | Casati et al. |
| 2004/0143637 A1 | 7/2004 | Koning et al. |
| 2004/0243607 A1 | 12/2004 | Tummalapalli |
| 2005/0010578 A1 | 1/2005 | Doshi |
| 2005/0039104 A1 | 2/2005 | Shah et al. |
| 2005/0060574 A1 | 3/2005 | Klotz et al. |
| 2005/0108444 A1 | 5/2005 | Flauaus et al. |
| 2005/0120160 A1 | 6/2005 | Plouffe et al. |
| 2005/0172018 A1 | 8/2005 | Devine et al. |
| 2005/0188221 A1 | 8/2005 | Motsinger et al. |
| 2006/0167939 A1 | 7/2006 | Seidman et al. |
| 2006/0224725 A1 | 10/2006 | Bali et al. |
| 2006/0242282 A1 | 10/2006 | Mullarkey |
| 2006/0271677 A1 | 11/2006 | Mercier |
| 2007/0136331 A1 | 6/2007 | Hasan et al. |
| 2007/0226554 A1 | 9/2007 | Greaves et al. |
| 2008/0104230 A1 | 5/2008 | Nasuto et al. |
| 2008/0126534 A1 | 5/2008 | Mueller et al. |
| 2008/0183876 A1 | 7/2008 | Duvur et al. |
| 2009/0049524 A1 | 2/2009 | Farrell et al. |
| 2009/0154366 A1 | 6/2009 | Rossi |
| 2009/0199196 A1 | 8/2009 | Peracha |
| 2010/0030915 A1 | 2/2010 | Kiefer et al. |
| 2010/0077462 A1 | 3/2010 | Joffe et al. |
| 2010/0208742 A1 | 8/2010 | Kafle et al. |
| 2010/0279622 A1 | 11/2010 | Shuman et al. |
| 2010/0287171 A1 | 11/2010 | Schneider |
| 2010/0293296 A1 | 11/2010 | Hsu et al. |
| 2011/0126111 A1 | 5/2011 | Gill et al. |
| 2011/0196890 A1 | 8/2011 | Pfeifle et al. |
| 2012/0101800 A1 | 4/2012 | Miao et al. |
| 2012/0110185 A1 | 5/2012 | Ganesan et al. |
| 2012/0131591 A1 | 5/2012 | Moorthi et al. |
| 2012/0254443 A1 | 10/2012 | Ueda |
| 2012/0254444 A1 | 10/2012 | Harchol-Balter et al. |
| 2012/0291099 A1 | 11/2012 | Grube et al. |
| 2013/0013953 A1 | 1/2013 | Eck et al. |
| 2013/0086230 A1 | 4/2013 | Guerra et al. |
| 2013/0086273 A1 | 4/2013 | Wray et al. |
| 2013/0151853 A1 | 6/2013 | Azzouz et al. |
| 2013/0179289 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0211559 A1 | 8/2013 | Lawson et al. |
| 2013/0212257 A1 | 8/2013 | Murase et al. |
| 2013/0290538 A1 | 10/2013 | Gmach et al. |
| 2013/0326044 A1 | 12/2013 | Maldaner |
| 2013/0326623 A1 | 12/2013 | Kruglick |
| 2013/0343213 A1 | 12/2013 | Reynolds et al. |
| 2013/0346594 A1 | 12/2013 | Banerjee et al. |
| 2014/0006862 A1 | 1/2014 | Jain et al. |
| 2014/0032785 A1* | 1/2014 | Chaudhuri .......... H04L 67/1001 |
| | | 709/245 |
| 2014/0059179 A1 | 2/2014 | Lam |
| 2014/0101226 A1 | 4/2014 | Khandekar et al. |

(56) References Cited

U.S. PATENT DOCUMENTS

| | | |
|---|---|---|
| 2014/0122725 A1 | 5/2014 | Batrouni et al. |
| 2014/0143406 A1 | 5/2014 | Malhotra et al. |
| 2014/0173675 A1 | 6/2014 | Ahmed et al. |
| 2014/0215058 A1 | 7/2014 | Vicat-Blanc et al. |
| 2014/0215621 A1 | 7/2014 | Xaypanya et al. |
| 2014/0229706 A1 | 8/2014 | Kuesel et al. |
| 2014/0280886 A1 | 9/2014 | Burns |
| 2014/0282160 A1 | 9/2014 | Zarpas |
| 2014/0304414 A1 | 10/2014 | Yengalasetti et al. |
| 2014/0344439 A1 | 11/2014 | Kempf et al. |
| 2014/0351226 A1 | 11/2014 | Christodorescu et al. |
| 2014/0373140 A1* | 12/2014 | Waters, Jr. .......... H04L 63/1458 726/22 |
| 2015/0058265 A1 | 2/2015 | Padala et al. |
| 2015/0074679 A1 | 3/2015 | Fenoglio et al. |
| 2015/0081880 A1 | 3/2015 | Eaton et al. |
| 2015/0106325 A1 | 4/2015 | Cole et al. |
| 2015/0106523 A1 | 4/2015 | Cui et al. |
| 2015/0124640 A1 | 5/2015 | Chu et al. |
| 2015/0134831 A1 | 5/2015 | Hiroishi |
| 2015/0199219 A1 | 7/2015 | Kim et al. |
| 2015/0212829 A1 | 7/2015 | Kupershtok et al. |
| 2015/0244626 A1 | 8/2015 | Childress et al. |
| 2015/0278061 A1 | 10/2015 | Siciliano et al. |
| 2015/0288682 A1 | 10/2015 | Bisroev et al. |
| 2015/0293954 A1 | 10/2015 | Hsiao et al. |
| 2015/0295780 A1 | 10/2015 | Hsiao et al. |
| 2015/0295796 A1 | 10/2015 | Hsiao et al. |
| 2015/0358391 A1 | 12/2015 | Moon et al. |
| 2015/0370852 A1 | 12/2015 | Shastry et al. |
| 2015/0381558 A1 | 12/2015 | Tuliani |
| 2016/0036837 A1* | 2/2016 | Jain .................... H04L 63/1416 726/23 |
| 2016/0064277 A1 | 3/2016 | Park et al. |
| 2016/0065609 A1* | 3/2016 | Yan .................... H04L 63/1433 726/25 |
| 2016/0087879 A1 | 3/2016 | Matsubara et al. |
| 2016/0094401 A1 | 3/2016 | Anwar et al. |
| 2016/0094410 A1 | 3/2016 | Anwar et al. |
| 2016/0094431 A1 | 3/2016 | Hall et al. |
| 2016/0094483 A1 | 3/2016 | Johnston et al. |
| 2016/0103717 A1 | 4/2016 | Dettori et al. |
| 2016/0105335 A1 | 4/2016 | Choudhary et al. |
| 2016/0125330 A1 | 5/2016 | Borah |
| 2016/0127204 A1 | 5/2016 | Ozaki et al. |
| 2016/0149832 A1 | 5/2016 | Liang et al. |
| 2016/0162701 A1 | 6/2016 | Rosenberg et al. |
| 2016/0164738 A1 | 6/2016 | Pinski et al. |
| 2016/0182399 A1 | 6/2016 | Zadka et al. |
| 2016/0217022 A1 | 7/2016 | Velipasaoglu et al. |
| 2016/0294701 A1 | 10/2016 | Batrouni et al. |
| 2016/0294722 A1 | 10/2016 | Bhatia et al. |
| 2016/0323197 A1 | 11/2016 | Guzman et al. |
| 2016/0323377 A1 | 11/2016 | Einkauf et al. |
| 2016/0359719 A1 | 12/2016 | Travostino |
| 2016/0378635 A1 | 12/2016 | Taylor et al. |
| 2016/0380975 A1* | 12/2016 | Reddy ................ H04L 61/4511 726/12 |
| 2017/0041386 A1 | 2/2017 | Bhat et al. |
| 2017/0063933 A1 | 3/2017 | Shieh et al. |
| 2017/0093986 A1 | 3/2017 | Kim et al. |
| 2017/0126792 A1 | 5/2017 | Halpern et al. |
| 2017/0134481 A1 | 5/2017 | DeCusatis et al. |
| 2017/0195090 A1 | 7/2017 | Boidol et al. |
| 2017/0295207 A1 | 10/2017 | Yu et al. |
| 2017/0324555 A1 | 11/2017 | Wu et al. |
| 2017/0331907 A1 | 11/2017 | Jagannath et al. |
| 2017/0344618 A1 | 11/2017 | Horowitz et al. |
| 2018/0004582 A1 | 1/2018 | Hallenstål |
| 2018/0007126 A1 | 1/2018 | Borst et al. |
| 2018/0018244 A1 | 1/2018 | Yoshimura et al. |
| 2018/0041408 A1 | 2/2018 | Dagum et al. |
| 2018/0041470 A1 | 2/2018 | Schultz et al. |
| 2018/0046482 A1 | 2/2018 | Karve et al. |
| 2018/0063193 A1 | 3/2018 | Chandrashekhar et al. |
| 2018/0064392 A1* | 3/2018 | Ur ...................... A61B 5/1495 |
| 2018/0088935 A1 | 3/2018 | Church et al. |
| 2018/0089328 A1 | 3/2018 | Bath et al. |
| 2018/0136931 A1 | 5/2018 | Hendrich et al. |
| 2018/0239651 A1 | 8/2018 | Gong et al. |
| 2018/0278570 A1* | 9/2018 | Dhanabalan .......... H04L 67/101 |
| 2018/0287902 A1 | 10/2018 | Chitalia et al. |
| 2018/0302375 A1 | 10/2018 | Els |
| 2018/0309637 A1 | 10/2018 | Gill et al. |
| 2018/0335946 A1 | 11/2018 | Wu et al. |
| 2018/0367596 A1 | 12/2018 | Bache et al. |
| 2019/0014102 A1* | 1/2019 | Mathew .................. G06F 21/41 |
| 2019/0121672 A1 | 4/2019 | Ding et al. |
| 2019/0123970 A1 | 4/2019 | Rastogi et al. |
| 2019/0199790 A1* | 6/2019 | Yang .................... H04L 67/1008 |
| 2019/0238505 A1 | 8/2019 | Richards et al. |
| 2019/0297014 A1 | 9/2019 | Azgin et al. |
| 2020/0014594 A1 | 1/2020 | Lapiotis et al. |
| 2020/0076766 A1* | 3/2020 | Maslak ................ H04L 61/5007 |
| 2020/0136939 A1 | 4/2020 | Rastogi et al. |
| 2020/0136942 A1 | 4/2020 | Rastogi et al. |
| 2020/0142788 A1 | 5/2020 | Hu et al. |
| 2020/0169479 A1 | 5/2020 | Ireland |
| 2020/0218571 A1 | 7/2020 | Chen |
| 2020/0287794 A1 | 9/2020 | Rastogi et al. |
| 2020/0374039 A1 | 11/2020 | Rau et al. |
| 2020/0382390 A1 | 12/2020 | Basavaiah et al. |
| 2020/0382584 A1 | 12/2020 | Basavaiah et al. |
| 2021/0058453 A1 | 2/2021 | Balasubramanian et al. |
| 2021/0097183 A1* | 4/2021 | Chen ...................... G06F 21/88 |
| 2021/0119923 A1 | 4/2021 | Brown et al. |
| 2021/0349749 A1 | 11/2021 | Guha |
| 2021/0373971 A1 | 12/2021 | Lu et al. |
| 2022/0129560 A1* | 4/2022 | Bulut ................... G06F 21/577 |
| 2022/0141102 A1 | 5/2022 | Rastogi et al. |
| 2022/0147390 A1 | 5/2022 | Akinapelli et al. |
| 2022/0231949 A1 | 7/2022 | Ramaswamy et al. |
| 2022/0237203 A1 | 7/2022 | Das et al. |
| 2022/0272041 A1* | 8/2022 | Blakey ................ H04L 47/762 |
| 2022/0286373 A1 | 9/2022 | Rajagopalan et al. |
| 2022/0309164 A1* | 9/2022 | Chiu ................... G06F 21/6245 |
| 2022/0353201 A1 | 11/2022 | Navali et al. |
| 2022/0353244 A1* | 11/2022 | Kahn ..................... H04L 67/12 |
| 2022/0368676 A1* | 11/2022 | Shribman ............... H04L 67/56 |
| 2022/0368758 A1 | 11/2022 | Suri et al. |
| 2022/0400097 A1 | 12/2022 | Rao et al. |
| 2022/0400098 A1 | 12/2022 | Rao et al. |
| 2022/0417218 A1* | 12/2022 | Purta ................... H04L 63/029 |
| 2023/0012224 A1* | 1/2023 | Kumar .................. H04L 63/10 |
| 2023/0012641 A1* | 1/2023 | Rao ..................... H04L 63/1416 |
| 2023/0015603 A1* | 1/2023 | Smith ................... H04L 63/1433 |
| 2023/0018908 A1 | 1/2023 | Yue et al. |
| 2023/0019448 A1* | 1/2023 | Deshmukh ........... H04L 63/1433 |
| 2023/0024475 A1* | 1/2023 | Mandeyam ......... H04L 61/2503 |
| 2023/0042285 A1* | 2/2023 | Brazeau ................ H04L 67/63 |
| 2023/0052818 A1 | 2/2023 | Jain et al. |
| 2023/0074300 A1* | 3/2023 | Vanderwater ....... H04L 63/0272 |
| 2023/0115557 A1* | 4/2023 | Arolovitch .............. H04L 67/01 709/203 |
| 2023/0122630 A1* | 4/2023 | Balaiah ................ H04L 12/4641 709/224 |
| 2023/0153614 A1* | 5/2023 | Katz .................... G06Q 20/389 705/64 |
| 2023/0164046 A1* | 5/2023 | Shemer ................ H04L 43/065 709/224 |
| 2023/0164214 A1* | 5/2023 | Sheth .................. H04L 63/0823 709/224 |
| 2023/0171153 A1* | 6/2023 | Aharon ................. H04L 67/10 709/223 |
| 2023/0171171 A1 | 6/2023 | Basavaiah et al. |
| 2023/0231884 A1* | 7/2023 | Deshmukh .......... H04L 63/1441 726/1 |
| 2023/0247003 A1* | 8/2023 | Chanak ................ H04L 9/3226 726/1 |

(56) References Cited

U.S. PATENT DOCUMENTS

2023/0283537 A1* 9/2023 Balaiah .................. H04L 47/12
                                                    370/254
2023/0308985 A1* 9/2023 De Foy ................. H04W 40/24

OTHER PUBLICATIONS

Author Unknown, "Autoscaler," Compute Engine—Google Cloud Platform, Jun. 29, 2015, 6 pages, retrieved at http://web.archive.org/web/20150629041026/https://cloud.google.com/compute/docs/autoscaler/.

Author Unknown, "Autoscaling," Aug. 20, 2015, 4 pages, Amazon Web Services, retrieved from http://web.archive.org/web/20150820193921/https://aws.amazon.com/autoscaling/.

Author Unknown, "BPF, eBPF, XDP and Bpfilter . . . What are These Things and What do They Mean for the Enterprise?," Apr. 16, 2018, 11 pages, Netronome, retrieved from https://www.netronome.com/blog/bpf-ebpf-xdp-and-opfilter-what-are-these-things-and-what-do-they-mean-enterprise/.

Catania, V., et al., "PMT: a Tool to Monitor Performances in Distributed Systems," Proceedings of the 3rd IEEE International Symposium on High Performance Distributed Computing, Aug. 2-5, 1994, 8 pages, San Francisco, CA, USA.

Davis, David, "Post #8—Understanding vCenter Operations Badges," David Davis Blog, Apr. 29, 2014, 5 pages, retrieved from http://blogs.vmware.com/management/2014/04/david-davis-on-vcenter-operations-post-8-understanding-vcenter-operations-badges.html.

De George, Andy, "How to Scale an Application," Jun. 16, 2015, 8 pages, Github.com.

Liu, Feng, et al., "Monitoring of Grid Performance Based on Agent," 2007 2nd International Conference on Pervasive Computing and Applications, Jul. 26-27, 2007, 6 pages, IEEE, Birmingham, UK.

Non-Published commonly owned U.S. Appl. No. 15/055,450, filed Feb. 26, 2016, 37 pages, VMware, Inc.

Non-Published commonly Owned U.S. Appl. No. 16/905,571, filed Jun. 18, 2020, 40 pages, VMware, Inc.

Non-Published commonly Owned Related U.S. Appl. No. 17/381,010 with similar specification, filed Jul. 20, 2021, 31 pages, VMware, Inc.

Sevcik, Peter, et al., "Apdex Alliance," May 24, 2014, 5 pages, www.apdex.org.

Wallace, Paul, et al., "Feature Brief: Stingray's Autoscaling Capability," Brocade Community Forums, May 1, 2013, 5 pages, retrieved from http://community.brocade.com/t5/vADC-Docs/Feature-Brief-Stingray-s-Autoscaling-capability/ta-p/73843.

Yar, Mohammed, et al., "Prediction Intervals for the Holt-Winters Forecasting Procedure," International Journal of Forecasting, Month Unknown 1990, 11 pages, vol. 6, Issue 1, Elsevier Science Publishers B.V.

Zhang, Xuehai, et al., "A Performance Study of Monitoring and Information Services for Distributed Systems," Proceedings of the 12th IEEE International Symposium on High Performance Distributed Computing, Jun. 22-24, 2003, 12 pages, IEEE Computer Society, Washington, D.C., USA.

Non Published commonly owned U.S. Appl. No. 17/521,771, filed Nov. 8, 2021, 61 pages, VMware, Inc.

Non-Published commonly Owned U.S. Appl. No. 17/700,037, filed Mar. 21, 2022, 43 pages, VMware, Inc.

* cited by examiner

SECURITY AWARE LOAD BALANCING FOR A GLOBAL SERVER LOAD BALANCING SYSTEM

In the field of accessing applications that operate partially or entirely on servers or other machines accessed over a network such as the Internet, a typical application access first involves a client device (e.g., a computer, smart phone, tablet device, etc.) sending a domain name system (DNS) request to a DNS service engine. In return, the client receives a DNS response that includes a list of one or more IP addresses where the application is hosted. The IP addresses may be specific addresses of servers hosting the application, but commonly are virtual IP (VIPs) addresses that the client can use to send data to a network address translation (NAT) system or load balancer that forwards the data to a specific server that runs the application.

The DNS service engine can use a simplistic scheme such as round robin to cycle through the list of available IP addresses. In practice and commercially however, a DNS service engine usually operates in conjunction with a "Global Server Load Balancing" (GSLB) solution. A GSLB solution ensures that the incoming client requests are load balanced amongst the available sites, domains, and IP addresses, based on more sophisticated criterion such as: site or server load, proximity of clients to servers, server availability, performance parameters of latency and response times, etc. However, the prior art GSLB systems do not account for security issues that may arise at a datacenter that contains one set of servers for implementing the application for the client. In such prior art systems, the load balancers (LBs) of a GSLB system may assign a client to a datacenter that is undergoing a denial of service (DOS) attack. The DOS attack in some cases might result in poor performance of the application for the client, and assigning additional clients to a datacenter undergoing a DOS attack might exacerbate the situation and cause the DOS to take longer to resolve. Other security issues may make the servers of a particular datacenter less desirable to assign a customer to, but again, the prior art GSLB systems are not able to respond to such security issues. Therefore, there is a need in the art for security aware GLSB systems.

BRIEF SUMMARY

The method of some embodiments assigns a client to a particular datacenter from among multiple datacenters. The method is performed at a first datacenter, starting when it receives security data associated with a second datacenter. The method receives a DNS request from the client for a set of services provided by an application (e.g., a web server, an appserver, a database server, etc.) that executes on multiple computers operating in multiple datacenters. Based on the received security data, the method sends a DNS reply assigning the client to the particular datacenter instead of the second datacenter. The receiving and sending is performed by a DNS cluster of the datacenter in some embodiments. The particular datacenter includes a set of physical servers (i.e., computers) implementing the application for the client in some embodiments. The datacenter to which the client gets assigned can be the first datacenter or a third datacenter.

The security data is associated with a set of servers, at the second datacenter, that implement applications for clients in some embodiments. The security data is collected by hardware or software security agents at the second datacenter in some embodiments. These security agents can be implemented on the servers of second datacenter. The security agents monitor security reports generated by smart network interface cards (smart NICs) in the second datacenter in some embodiments.

The security data may indicate any of several different security conditions in different embodiments. The security data can indicate a compromised or less secure application at the second datacenter. The application is indicated to be less secure when not all available security patches have been applied to the application, in some embodiments.

In some embodiments, the DNS request is a first DNS request and the client is a first client. The method in some such embodiments also generates a source-IP deny-list based at least partly on the security data. The method receives a second DNS request from a second client. The method matches a source IP of the second DNS request with an IP address on the source-IP deny-list and drops the second DNS request based on the matching of the source IP and the IP address on the source-IP deny-list.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

The method of some embodiments assigns a client to a particular datacenter from among multiple datacenters. The method is performed at a first datacenter, starting when it receives security data associated with a second datacenter.

The method receives a DNS request from the client for a set of services provided by an application (e.g., a web server, an appserver, a database server, etc.) that executes on multiple computers operating in multiple datacenters. Based on the received security data, the method sends a DNS reply assigning the client to the particular datacenter instead of the second datacenter. The receiving and sending is performed by a DNS cluster of the datacenter in some embodiments. The particular datacenter includes a set of physical servers (i.e., computers) implementing the application for the client in some embodiments. The datacenter to which the client gets assigned can be the first datacenter or a third datacenter.

The security data is associated with a set of servers, at the second datacenter, that implement applications for clients in some embodiments. The security data is collected by hardware or software security agents at the second datacenter in some embodiments. These security agents can be implemented on the servers of second datacenter. The security agents monitor security reports generated by smart network interface cards (smart NICs) in the second datacenter in some embodiments.

The security data may indicate any of several different security conditions in different embodiments. The security data can indicate a compromised or less secure application at the second datacenter. The application is indicated to be less secure when not all available security patches have been applied to the application, in some embodiments.

In some embodiments, the DNS request is a first DNS request and the client is a first client. The method in some such embodiments also generates a source-IP deny-list based at least partly on the security data. The method receives a second DNS request from a second client. The method matches a source IP of the second DNS request with an IP address on the source-IP deny-list and drops the second DNS request based on the matching of the source IP and the IP address on the source-IP deny-list.

Figure 1:
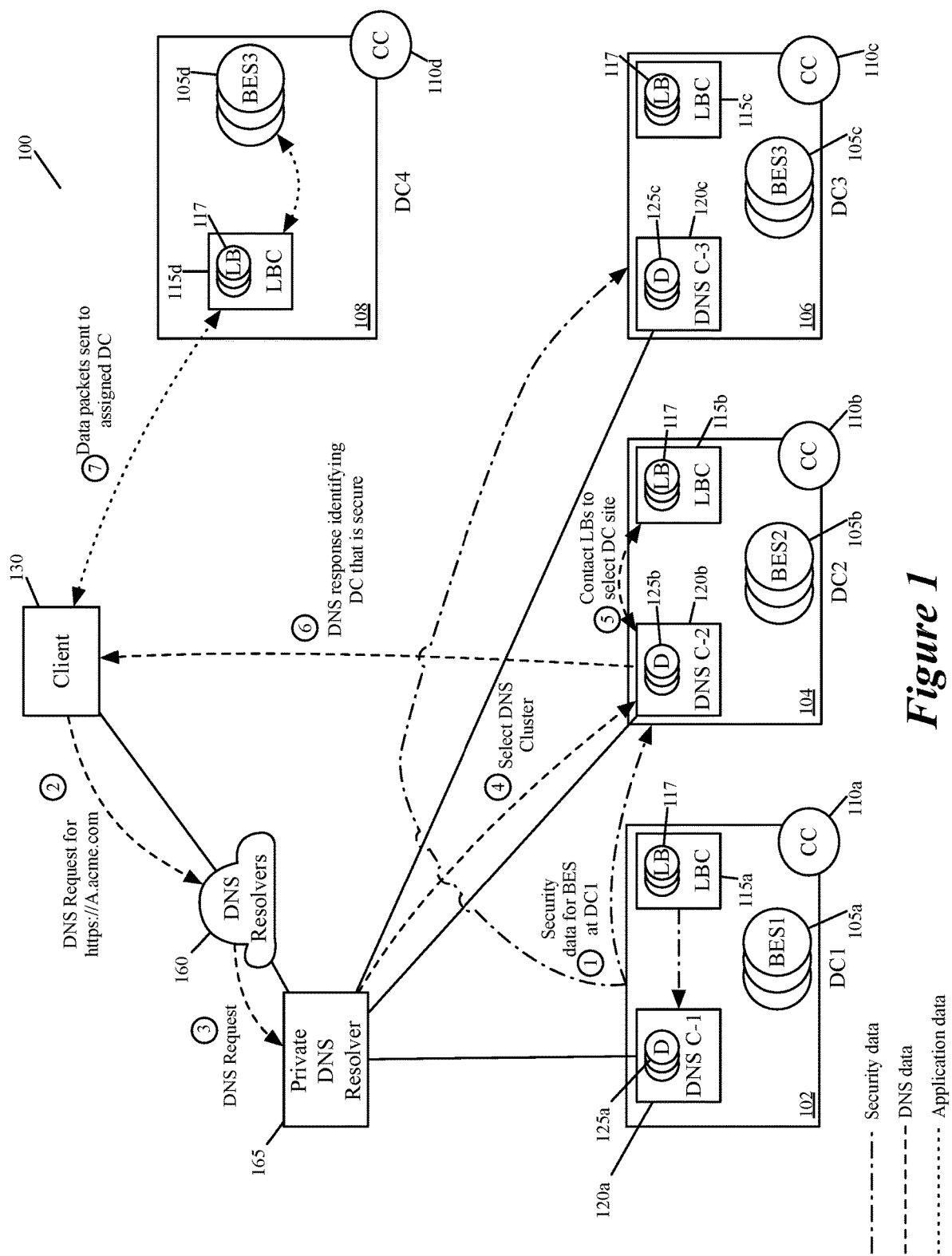
FIG. 1 illustrates an example of a security aware GSLB system.

FIG. 1 illustrates an example of a security aware GSLB system 100. In this example, backend application servers 105*a-d* are deployed in four datacenters 102-108. In some embodiments, one or more of these datacenters may be either public datacenters or private datacenters. The datacenters in this example are in different geographical sites (e.g., different neighborhoods, different cities, different states, different countries, etc.).

A cluster of one or more controllers 110*a-d* are deployed in each datacenter 102-108. Each datacenter also has a cluster 115*a-d* of load balancers 117 to distribute the client load across the backend application servers 105*a-d* in the datacenter. In this example, the datacenters 102-106 also have a cluster 120*a-c* of DNS service engines 125*a-c* to perform DNS operations to process (e.g., to provide network addresses for domain names provided by) DNS requests submitted by clients 130 inside or outside of the datacenters. In some embodiments, the DNS requests include requests for fully qualified domain name (FQDN) address resolutions. In some embodiments, one or more DNS service engines 125*a-c*, load balancers 117, and backend servers 105*a-d* may be implemented on a host computer (not shown) of the datacenter. In some embodiments, some individual host computer may include at least one DNS service engine 125*a-c*, at least one load balancer 117, and at least one backend server 105*a-d*. In some embodiments, load balancers 117 are implemented by service virtual machines (SVMs) and backend servers 105*a-d* are implemented by guest virtual machines (GVMs) on the same host computer.

Although datacenters 102-106 all include DNS service engines 125*a-c*, in some embodiments, datacenters such as 108 may include backend servers 105*d* and load balancers 117 or other elements for assigning a client to a particular backend server 105*d* but not include DNS service engines. Although several embodiments are described herein as including backend servers, in some embodiments the applications run partially or entirely on other kinds of servers, host computers, or machines of the datacenter. Similarly, one of ordinary skill in the art will understand that in some embodiments of the invention a portion of the application also runs partly on the client (e.g., an interface may run on the client that displays data supplied by the servers, some other functions of the application may be implemented by executable code running on the client, etc.). In general, servers that run at least some part of the application may be referred to as "application servers."

FIG. 1 illustrates the resolution of an FQDN that refers to a particular application "A" that is executed by the servers of the domain acme.com. As shown, this application is accessed through https and the URL "A.acme.com". The security aware GSLB operation is shown in multiple steps. First, security data is sent from the datacenter 102 to the datacenters 104 and 106 that contain DNS clusters 120*b* and 120*c*. The security data may include data about DOS attacks (e.g., that there is an ongoing attack, IP addresses of attackers to be added to a source-IP deny-list, etc.), compromised (or less secure) applications, other security insights produced by monitoring tools, etc. The types of security threats identified by the monitoring tools could include packets that are bad and/or malformed at the physical and/or data link layers (L1/L2 layers), volumetric attacks, TCP attacks, SYN-attacks, reset (RST)-attacks, HTTP attacks, URL misinterpretation, SQL Query poisoning, reverse proxying, session hijacking etc.

Different embodiments may generate or collect the security data from one or more sources at the datacenter. Some examples of software, hardware, or elements that include a combination of hardware and software that collect metrics to produce security data include (1) a smart network interface card (smartNIC) of a server or host computer of the datacenter, (2) a load balancer 117, (3) load balancer agents on the BES 105*a-d*, (4) DNS clusters 120*a-c* (or DNS service engines 125*a-c*), (5) DNS cluster agent operating on the BESs 105*a-d*, and/or (6) other agents on host computers of the backend server. In some embodiments, one or more of the above elements collects metrics from third party hardware or software, such as an agent collecting alerts from a smartNIC. Additionally, some elements may collect data from multiple sources, such as receiving alerts from smartNICs and security update status information from backend servers, etc. Examples of servers 105*a-d* with agents are described in more detail with respect to FIG. 3, below.

In the description of the illustrated example, the security data is assumed to be serious enough to warrant barring the datacenter 102 from being assigned new clients (e.g., until a DOS attack is resolved and new security data clears the GSLB system to begin assigning clients to datacenter 102 again). However, in some embodiments, security data may be serious enough to warrant some action, but not indicate enough of a threat to warrant entirely barring a datacenter. For example, the security data may indicate that the latest security patches have been applied to applications at a first datacenter, but not applications at a second datacenter. The security aware GSLB system in such embodiments could create a preference for assigning clients to the first datacenter until the second datacenter is up-to-date on its security patches.

Although FIG. 1 shows the security data passing through the DNS cluster 120a and being send to DNS clusters 120b and 120c, in other embodiments, the security data may be sent directly from the servers 105a to DNS clusters 120b and 120c. In some embodiments, different routing operations are performed depending on routing choices by administrators of the GSLB system or selected automatically depending on available elements in the datacenters. For example, in some embodiments, security data from servers in a datacenter with a DNS cluster, such as datacenters 102-106, would be sent out through the DNS cluster, but security data from servers in a datacenter without a DNS cluster, such as datacenter 108 would be send directly from the servers 105d, through the load balancers, or through the controllers 110d. However, in other embodiments, even a datacenter with a DNS cluster may send security data out through some other element such as the controllers, etc., as further described with respect to FIG. 4.

The next parts of the security aware GSLB operation happen after the security data is received at a DNS cluster. Labeled as second in the figure, a DNS request comes in from a client 130, through a DNS resolver 160. The DNS resolver 160 is a server on the Internet that converts a domain name into an IP addresses, or as it does here, forwards the DNS request to another DNS resolver 165. Third, the DNS request is forwarded to a private DNS resolver 165 of the enterprise that owns or manages the private datacenters 102-108. Fourth, the private DNS resolver 165 selects one of the DNS clusters 120a-c. This selection is random in some embodiments, while in other embodiments it is based on a set of load balancing criteria that distributes the DNS request load across the DNS clusters 120a-c.

Fifth, the selected DNS cluster 120b resolves the domain name to an IP address. The IP address may be a virtual IP address associated with a particular datacenter, which is possibly one of multiple VIP addresses associated with that particular datacenter. In some embodiments, each DNS cluster includes multiple DNS service engines 125a-c, such as DNS service virtual machines (SVMs) that execute on host computers in the cluster's datacenter. When one of the DNS clusters 120a-c receives a DNS request, a frontend load balancer (not shown) in some embodiments selects one of the DNS service engines 125a-c in the cluster to respond to the DNS request, and forwards the DNS request to the selected DNS service engine. Other embodiments do not use a frontend load balancer, and instead have a DNS service engine serve as a frontend load balancer that selects itself or another DNS service engine in the same cluster for processing the DNS request.

The DNS service engine 125b, in some embodiments, contacts the load balancer 115b, which uses a set of criteria to select a VIP from among the VIPs of all datacenters that execute the application. The set of criteria for this selection in some embodiments includes (1) the security data or information derived from the security data, (2) the number of clients currently assigned to use various VIPs, (3) the number of clients using the VIPs at the time, (4) data about the burden on the backend servers accessible through the VIPs, (5) geographical or network locations of the client and/or the datacenters associated with different VIPs, etc. Also, in some embodiments, the set of criteria include load balancing criteria that the DNS service engines use to distribute the data message load on backend servers that execute application "A."

In the example illustrated in FIG. 1, the selected backend server cluster is the server cluster 105d in the datacenter 108.

Sixth, after selecting this backend server cluster 105d for the DNS request that it receives, the DNS service engine 125b of the DNS cluster 120b returns a DNS response to the requesting client 130. This response includes the VIP address associated with the selected backend server cluster 105d. In some embodiments, this VIP address is associated with the local load balancer cluster 115d that is in the same datacenter 108 as the selected backend server cluster. Datacenters without a DNS such as datacenter 108 may still include load balancers 115d for local load balancing operations (e.g., assigning each client to a particular backend server 105d). Although in this example, the backend server cluster 105d is in a datacenter 108 without a DNS cluster of its own, other clients (not shown) of the embodiment of FIG. 1 are assigned to backend server clusters 105b or 105c that include DNS clusters 120b and 120c, respectively.

In the illustrated example, no new clients would be assigned to servers 105a in datacenter 102. However, in some embodiments, security data may be received that results in a preference for or against assigning clients to a particular datacenter rather than an absolute bar. For example, a datacenter that has not implemented the latest security patch for the application may be less preferable than a datacenter that has implemented the security patch, but the load balancers could still assign a client to the less secure datacenter if all secure datacenters were operating at high or maximum capacity.

Seventh, after getting the VIP address, the client 130 sends one or more data message flows to the assigned VIP address for the backend server cluster 105d to process. In this example, the data message flows are received by the local load balancer cluster 115d and forwarded to one of the backend servers 105d. In some embodiments, each of the load balancer clusters 115a-d has multiple load balancing engines 117 (e.g., load balancing SVMs) that execute on host computers in the cluster's datacenter.

When the load balancer cluster receives the first data message of the flow, a frontend load balancer (not shown) in some embodiments selects a load balancing service engine 117 in the cluster to select a backend server 105d to receive the data message flow, and forwards the data message to the selected load balancing service engine 117. Other embodiments do not use a frontend load balancer, and instead have a load balancing service engine 117 in the cluster serve as a frontend load balancer that selects itself or another load balancing service engine 117 in the same cluster for processing the received data message flow.

When a selected load balancing service engine 117 processes the first data message of the flow, in some embodiments, this service engine uses a set of load balancing criteria (e.g., a set of weight values) to select one backend server from the cluster of backend servers 105d in the same datacenter 108. The load balancing service engine 117 then replaces the VIP address with an actual destination IP (DIP) address of the selected backend server (among servers 105d), and forwards the data message and subsequent data messages of the same flow to the selected backend server. The selected backend server then processes the data message flow, and when necessary, sends a responsive data message flow to the client 130. In some embodiments, the responsive data message flow is sent through the load balancing service engine that selected the backend server for the initial data message flow from the client 130.

In some embodiments, the load balancer cluster 115d maintains records of which server each client has previous been assigned to and when later data messages from the same client are received, the load balancer cluster 115d forwards the messages to the same server. In other embodiments, data messages sent to the VIP address are received by a NAT engine (not shown) that translates the VIP address into an internal address of a specific backend server. In some such embodiments, the NAT engine maintains records of which server each client is assigned to and sends further messages from that client to the same server. In some embodiments, the NAT engine may be implemented as part of the load balancer cluster 115d.

One of ordinary skill in the art will understand that the present invention applies to a wide variety of threats to datacenters and their servers, DNS clusters, load balancers, controllers, etc. The types of security threats identified and dealt with by the methods of some embodiments could include packets that are bad and/or malformed at the physical and/or data link layers (L1/L2 layers), volumetric attacks, TCP attacks, SYN-attacks, reset (RST)-attacks, HTTP attacks, URL misinterpretation, SQL Query poisoning, reverse proxying, session hijacking etc. Similarly, although the description of the attacks with respect to FIGS. 1-6 focus on security attacks against the application servers of datacenters, in some embodiments, the GSLB system determines datacenters to avoid based on attacks on other components of a datacenter. In some embodiments security data is sent through the same data streams as DNS and/or application data (e.g., in-band) alternatively, the security data may be sent through separate data streams (e.g., out-of-band).

In some embodiments, the security awareness of the GSLB system is implemented on an application by application basis. That is, the determination of which datacenter to assign a client of a particular application to will be affected by security data relevant only to that particular application. However, in other embodiments, the security awareness of the GSLB system is implemented on a multi-application basis. That is, the determination of which datacenter to assign a client of a particular application will be affected by security data relevant to other applications.

Figure 2:
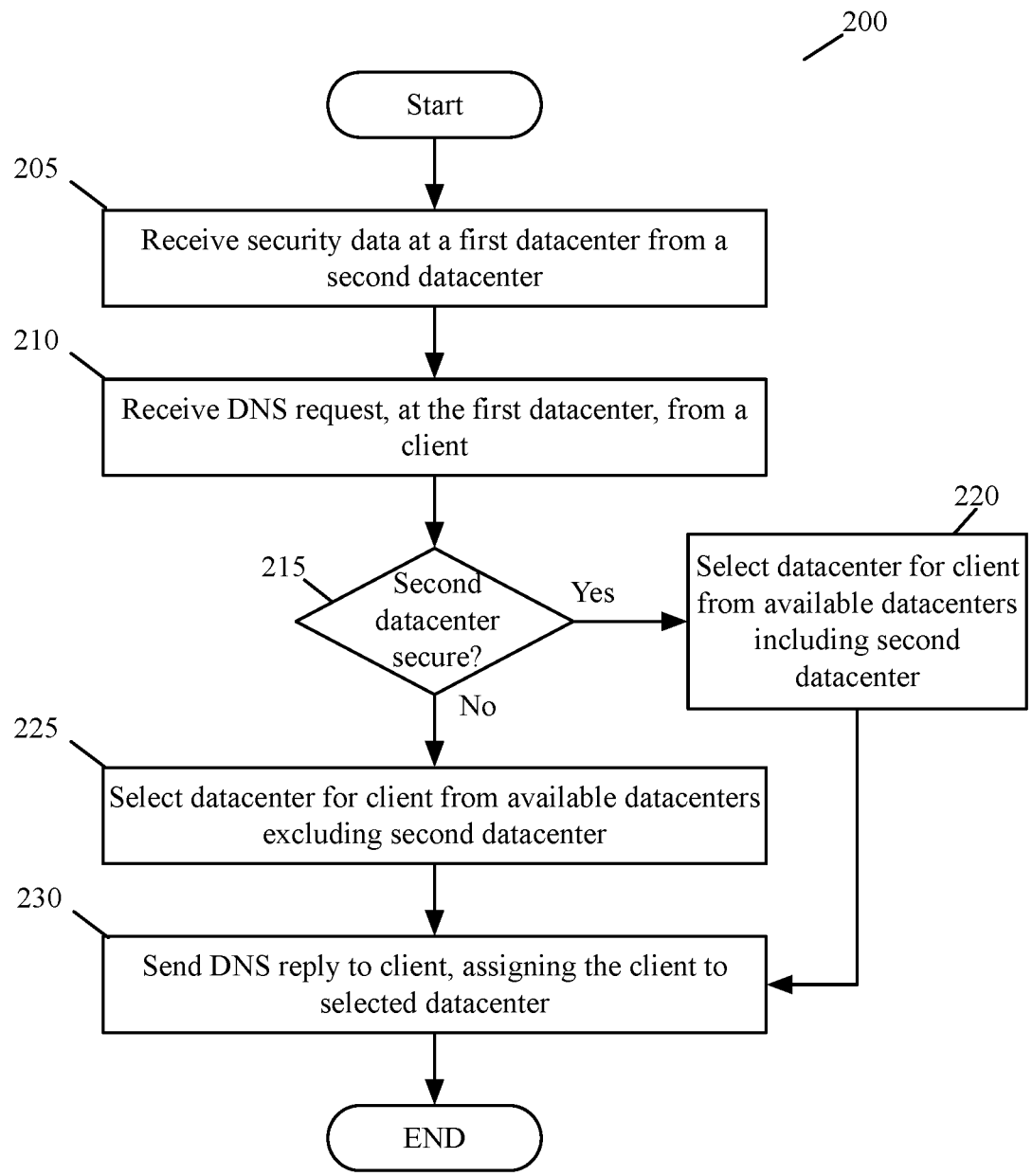
FIG. 2 conceptually illustrates a process of some embodiments for selecting a sending a DNS reply to a client.

FIG. 2 conceptually illustrates a process 200 of some embodiments for selecting and sending a DNS reply to a client. The process 200 receives (at 205) security data at a first datacenter from a second datacenter. In some embodiments, the security data is sent from the second datacenter to the first datacenter directly, in other embodiments, the security data is sent from the second datacenter to some other datacenter before being forwarded to the first datacenter, either in the same form as it was sent from the second datacenter or in some modified form such as an analyzed or condensed form of the security data sent from the second datacenter. The security data in some embodiments may include routine security status updates, e.g., indicating that the second datacenter does not have any security issues, alerts that the second datacenter is not secure, or cancelations of earlier alerts.

The process 200 then receives (at 210) a DNS request, at the first datacenter, from a client. The DNS request may be received at a DNS cluster of the first datacenter which then assigns a DNS service engine to handle the request. The process 200 then determines (at 215), based on the received security data, whether the second datacenter is secure. When the second datacenter is secure, the process 200 selects (at 220) a datacenter from among the available datacenters, including the second datacenter, then sends (at 230) a DNS reply, to the client, assigning the client to the selected datacenter. When the second datacenter is not secure, the process 200 selects (at 225) a datacenter from among the available datacenters, excluding the second datacenter, then sends (at 230) a DNS reply, to the client, assigning the client to the selected datacenter. The process 200 then ends.

Figure 3:
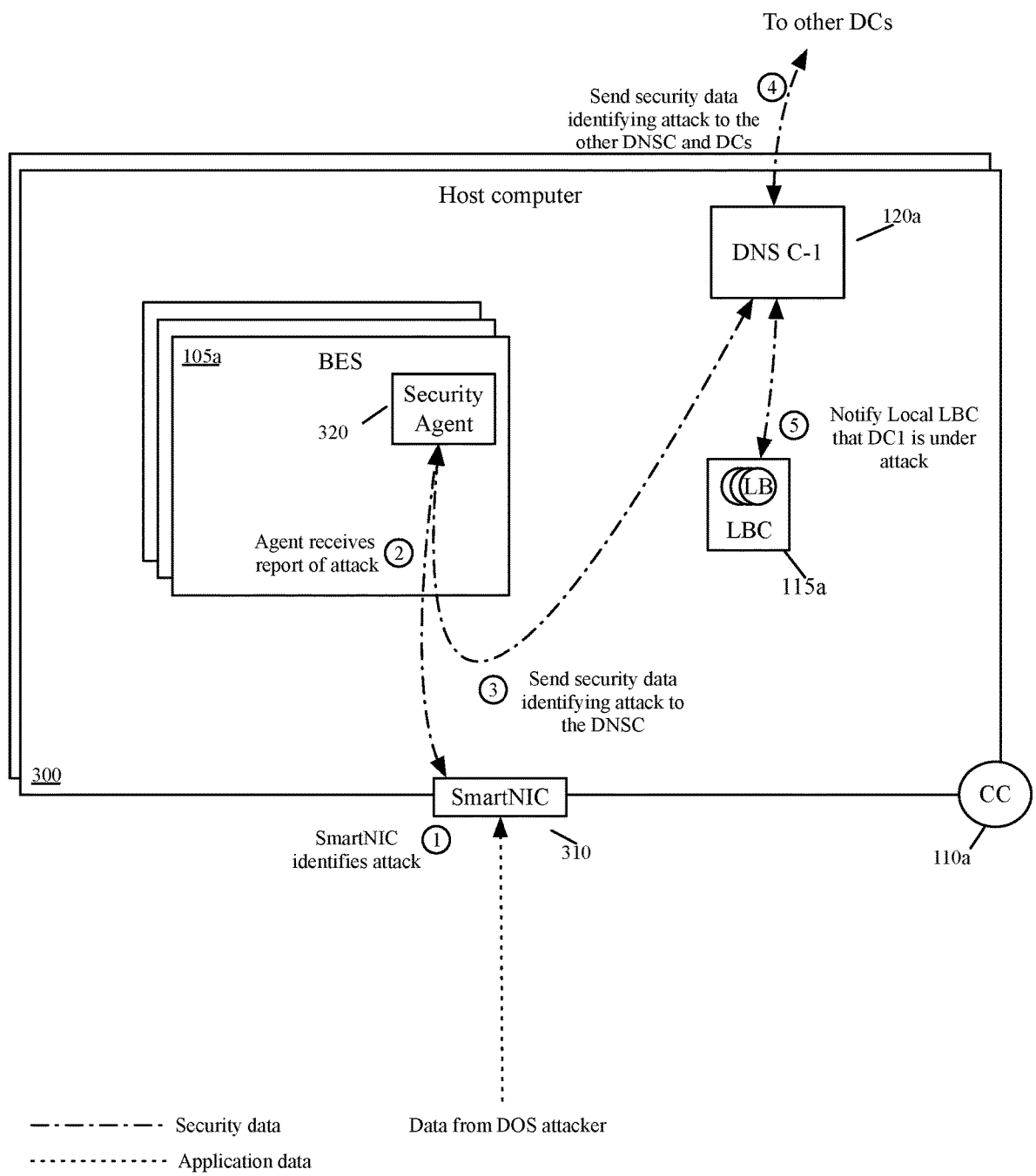
FIG. 3 illustrates operations of security elements of a datacenter that is under a DOS attack.
Figure 4:
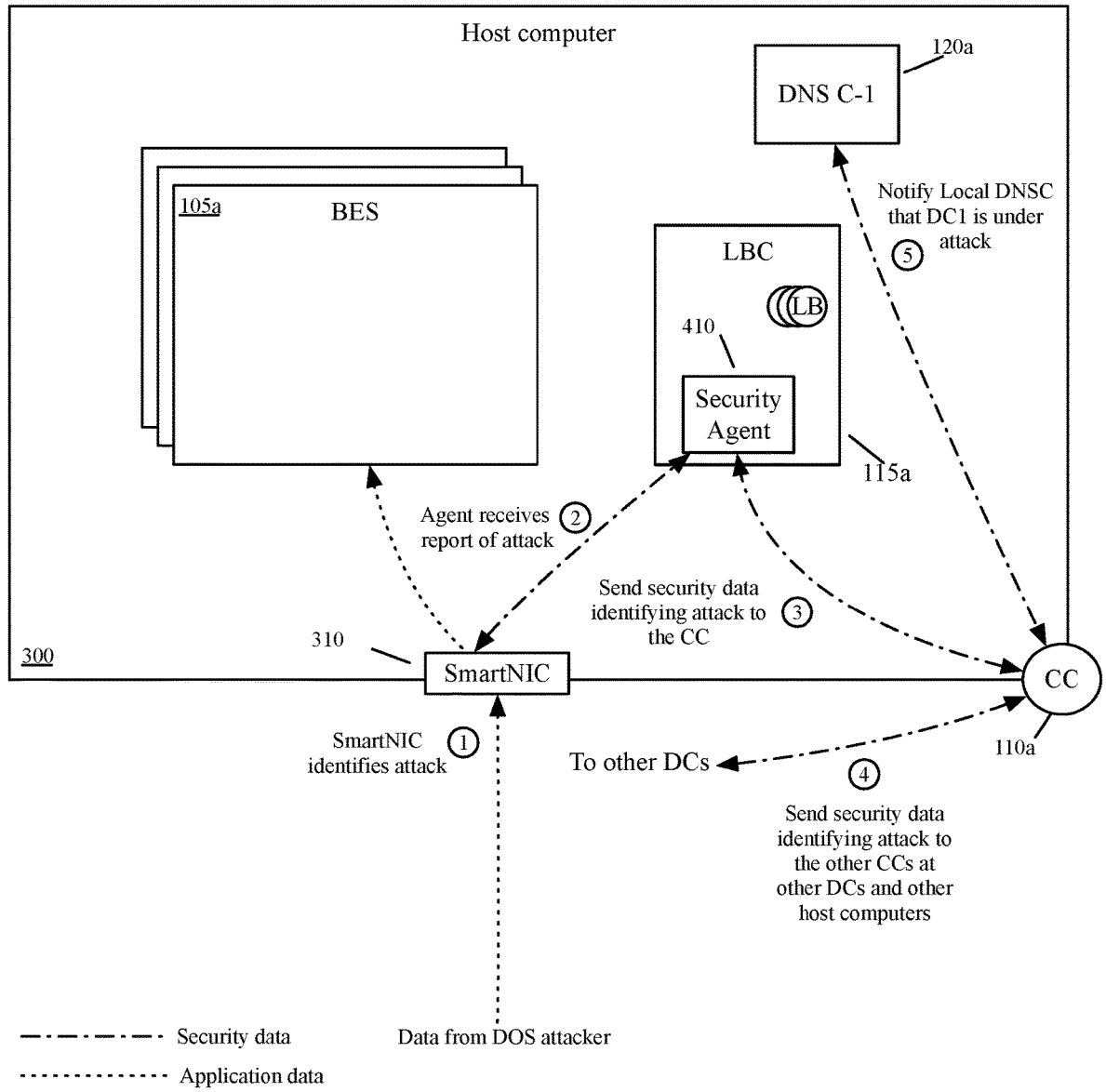
FIG. 4 illustrates operations of security elements of a datacenter that passes security data through controllers instead of DNS clusters.

As mentioned above, various embodiments use different elements to gather metrics to produce the security data including (1) a smart network interface card (smartNIC) of a server or host computer of the datacenter, (2) a load balancer 117, (3) load balancer agents on the BESs 105a-d, (4) DNS clusters 120a-c (or DNS service engines 125a-c), (5) DNS cluster agents operating on the BESs 105a-d, and/or (6) another agent on the host computer of the backend server. Additionally, different embodiments may distribute data through different elements. FIGS. 3 and 4 provide two examples of embodiments that use different elements to gather and distribute security data. However, one of ordinary skill in the art will understand that the present invention is not limited to these examples and can gather and distribute security data through a variety of elements. Some embodiments may gather and/or distribute security data using more than one element (e.g., using agents on the backend servers and the load balancers).

FIG. 3 illustrates operations of security elements of a host computer 300 of a datacenter that is under a DOS attack. FIG. 3 includes BESs 105a, controllers 110a, load balancer cluster 115a, and DNS cluster 120a, previously described in relation to FIG. 1. FIG. 3 also includes host computer(s) 300 and interface cards (smartNICs) 310/Host computer(s) 300 implement BES 105a, DNS cluster 120a, and LBC 115a. BES 105a has a security agent 320. The operation of identifying an attack and disseminating security data relating to the backend servers 105a takes multiple steps. First, smartNICs 310 identify an attack (in this example, the attack is a DOS attack). Second, the security agent 320 receives reports, warnings, alerts or other data about the attack from the smartNICs 310 and generate security data based on those reports. In some embodiments, the security agents 320 query the smartNICs 310 for the reports. In other embodiments, the smartNICs 310 automatically send the reports to the security agents. In still other embodiments, rather than smartNICs, other hardware, software, or combination of hardware and software identifies attacks and produces reports that are received by the security agents 320.

Third, the security agent 320 sends security data identifying the attack to the DNS cluster 120a. Fourth, the DNS cluster 120a sends security data identifying the attack on the BES 105a of datacenter 102 to the DNS clusters (not shown) of other datacenters (not shown) in the GSLB system. In some embodiments, a single datacenter may include multiple host computers 300 that include DNS clusters, BESs, load balancers, and/or controllers. In such embodiments, whichever element distributes the security data to other datacenters, or some other element on a host computer 300, also distributes the security data to other host computers 300 in the same datacenter. Here, as part of the fourth step, the DNS cluster 120a also sends the security data to other DNS clusters in the same datacenter as host computer 300. Fifth, the DNS cluster 120a notifies the local LBC 115a that the BES 105a of the host computer 300 is under attack. Notifying the LBC 115a prompts the load balancers of LBC 115a to avoid assigning clients to the BESs 105a (in some embodiments including the BESs on other host computers of the datacenter).

The illustrated embodiment shows certain specific elements operating in specific machines. However, other embodiments may implement such elements on other machines. For example, although the security agents 320 are shown as operating on BES 105a and smartNICs 310 are shown as operating on host machines 300, in other embodiments, such security agents may be operated on other elements of the host computer 300 (instead of or on addition to operating on the BES 105a), on separate computers or devices implementing DNS functions and/or LB functions, etc. Similarly, although the security agent 320 in illustrated embodiments is shown as monitoring smartNICs 310 on the same host computer 300 as the security agents 320, in other embodiments, the security agents 320 may monitor smart-NICs 310, other security hardware, software operating on other computers or devices (different from the computers that implement security agents 320).

As previously mentioned, in some embodiments, security data is disseminated through the DNS clusters of datacenters. However, in other embodiments, security data is passed through other datacenter elements, such as controllers. Embodiments that disseminate security data through controllers may do so because there are individual host computers or even entire datacenters without DNS clusters. On such host computers or datacenters, other elements are used to disseminate the security data once it has been collected. In other embodiments, even host computers that have DNS clusters may use controllers to disseminate security data. One possible advantage to avoiding using DNS clusters to disseminate data would be because those DNS clusters might themselves be targeted as part of attacks such as DOS attacks.

FIG. 4 illustrates operations of security elements of a host computer 300 of a datacenter that passes security data through controllers 110a instead of DNS cluster 120a. FIG. 4 includes BES 105a, one or more controllers 110a, load balancer cluster 115a, and DNS cluster 120a, previously described in relation to FIG. 1. FIG. 4 also includes additional elements of the LBC 115a, specifically a security agent 410 operating on the LBC 115a that collects metrics, alerts, or reports from the smartNIC 310 and produces security data. The operation of identifying an attack and disseminating security data relating to the backend servers 105a takes multiple steps. First, smartNICs 310 of the BES identify an attack (in this example, the attack is a DOS attack). Second, the security agent 410 receives reports, warnings, or other data about the attack from the smartNICs 310 and generates security data based on those reports. In some embodiments, the security agent 410 queries the smartNICs 310 for the reports. In other embodiments, the smartNICs 310 automatically send the reports to the security agent 410. In still other embodiments, rather than smart-NICs, other hardware, software, or combination of hardware and software identifies attacks and produces reports that are received by the security agent 410.

Third, the security agent 410 sends security data identifying the attack to the controllers 110a. Fourth, the controllers 110a send security data identifying the attack on the BES 105a of host computer 300 of the datacenter to the controllers of other datacenters (not shown) in the GSLB system. In some embodiments, the controllers 110a also send the security data to other host computers (not shown), e.g., to the controllers (not shown) of the other host computers.

Fifth, the controllers 110a sends security data about the attack to the DNS cluster 120a (e.g., to add identifiers of the attackers to a deny-list as further described with respect to FIGS. 5 and 6, below). In this embodiment, since the security agent 410 is part of the LBC 115a, the security agent 410 prompts the load balancers of LBC 115a to avoid assigning clients to the BES 105a of the datacenter. In some embodiments, in addition to or instead of the security agent 410 directly notifying the LBC 115a of the attack, the controllers 110a notify the LBC 115a of the attack (e.g., in order to maintain consistency with the way that security data from other host computers is disseminated). In some embodiments, LBC 115a sends security data about the attack to the DNS cluster 120a on the same host computer that was attacked instead of or in addition to the controller 110a sending the security data.

The preceding FIGS. 2-4 illustrated embodiments in which the security aware GSLB system protected the clients by assigning them to more secure datacenters (e.g., datacenters that were not under attack, datacenters where not all security patches have been applied, etc.). However, in some embodiments, in addition to or instead of directing clients away from less secure datacenters, the security aware GSLB system also protects datacenters from potential attacks. In such embodiments, the security data sent from a datacenter under attack to other datacenters includes client identifiers of clients that are involved in the attack.

Figure 5:
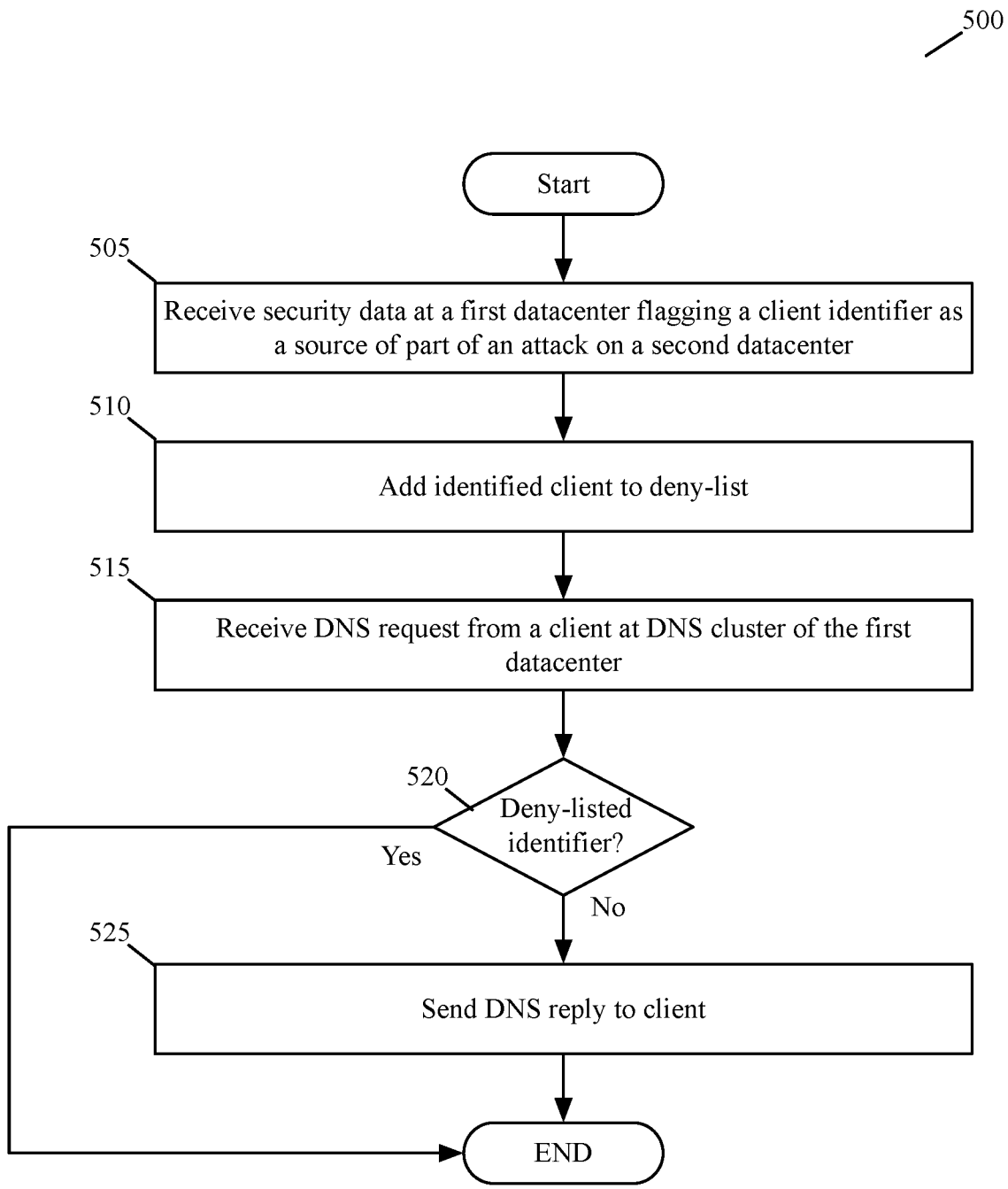
FIG. 5 conceptually illustrates a process for protecting a datacenter from a client involved in an attack on another datacenter in a security aware GSLB system.

FIG. 5 conceptually illustrates a process 500 for protecting a datacenter from a client involved in an attack on another datacenter in a security aware GSLB system. The process 500 receives (at 505) security data at a first datacenter flagging a client identifier as a source of part of an attack on a second datacenter. Here, the term "client" includes any devices that send a DNS request to a datacenter in an attempt to receive access to the application servers. In some embodiments, the client identifier is an IP address of the client.

The process 500 then adds (at 510) the identified client to a deny-list of clients that the DNS cluster should not supply an IP address (e.g., a VIP address) to. In some embodiments, this deny-list is a source-IP deny-list that contains the IP addresses of the clients on the deny-list. However, in other embodiments, the deny-list may include additional or different client identifier(s) such as a MAC address, source port address, etc. In some embodiments, the deny-list may contain ranges of IP addresses as well as individual IP addresses.

Later, the process 500 receives (at 515) a DNS request from a client at the DNS cluster of the first datacenter. One of ordinary skill in the art will understand that a DNS request includes a source IP address and/or other identifiers for the client that sent the request. The process 500 determines (at 520) whether the identified client in the DNS request is on the deny-list. For example, if the client identifier is the source IP address, the DNS cluster will determine whether the source IP address is on the source-IP deny-list. If the client is not on the deny-list, then the process 500 sends (at 525) a DNS reply to the client and then ends. One of ordinary skill in the art will understand that, in some embodiments, the DNS cluster will query an LBC in order to identify an IP address to include in the DNS reply to the client.

If the client is on the deny-list, then the process 500 ends without sending a DNS reply to the client. By not sending a DNS reply, the process 500 protects application servers to which the attacking client might have been assigned. The protected servers include any servers that the LBC of the first datacenter could have assigned the client to. One of ordinary skill in the art will understand that in some embodiments, there are additional operations triggered by matching a client identifier to the deny-list. For example, in some embodiments, an attempt by a client on the deny-list to obtain an IP address may be noted in a security report and/or some kind of response to the DNS request (other than a DNS reply assigning the client to a backend server of the application) could be sent to the source IP address. The client deny-listing process 500 in some embodiments applies to clients involved in attacks only on the same application for which the client seeks a DNS request. However, in other embodiments, the process 500 may apply to clients involved in attacks on other applications at datacenters used by the GSLB system.

Figure 6:
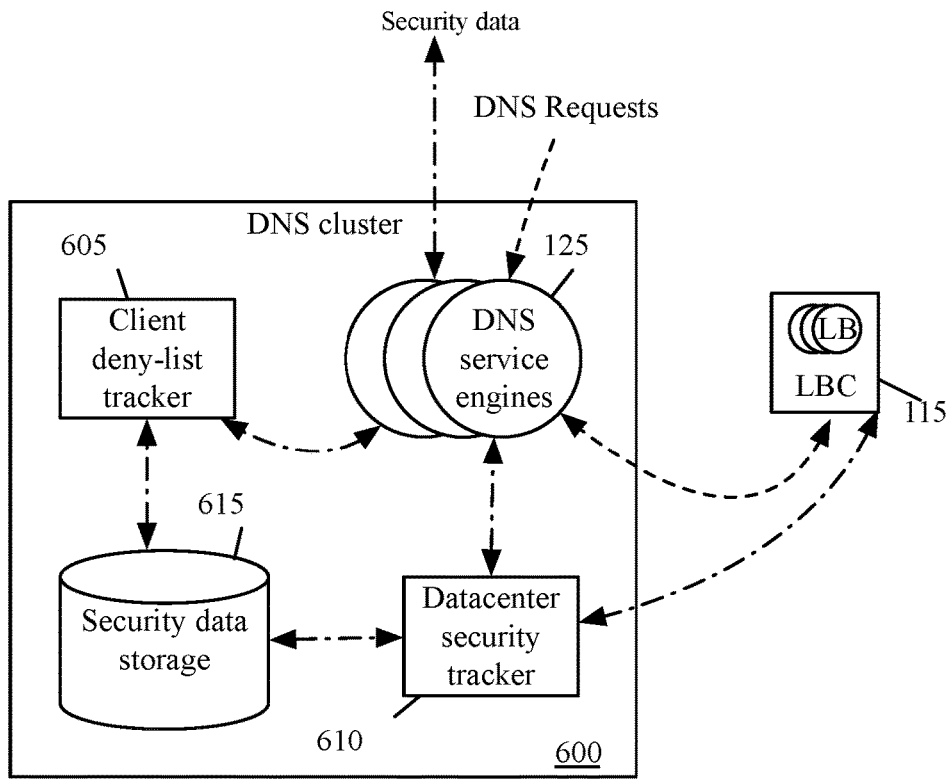
FIG. 6 illustrates a DNS cluster of some embodiments.

FIG. 6 illustrates a DNS cluster 600 of some embodiments. The DNS cluster 600 includes multiple DNS service engines 125, a client deny-list tracker 605, a datacenter security tracker 610, and a security data storage 615. The DNS cluster 600 communicates with LBC 115. One of ordinary skill in the art will understand that some or all of the elements of the DNS cluster 600 may be implemented as hardware, software, or a combination of hardware and software. Additionally, in some embodiments, the operations described as being performed by multiple elements may be performed by a single element, and/or operations described as being performed by a single element may be performed by multiple elements.

The DNS service engines receive DNS requests and security data. The DNS service engines 125 query the client deny-list tracker about each DNS request (to determine whether the client that sent the request is on the deny-list). Additionally, the DNS service engines 125 sends security data, e.g., received from other datacenters, that identifies clients on the deny-list to the client deny-list tracker. The client deny-list tracker 605 stores the client identifying data of the clients on the deny-list in the security data storage 615. The client deny-list tracker 605 also queries the security data storage 615 when the DNS service engines 125 query the client deny-list tracker 605 when a DNS request is received from a client to determine whether that client is on the deny-list.

The DNS service engines 125 also supply security data, relating to the status of the datacenters in the GSLB system, to the datacenter security tracker 610. The datacenter security tracker 610 stores the security information in the security data storage 615 and provides relevant security data to the LBC 115. For example, if a datacenter is under a DOS attack, the datacenter security tracker 610 would direct the LBC 115 to avoid (partially or entirely) assigning clients to the datacenter that is under attack. Similarly, if the application servers of a datacenter lack the most recent security patches or updates, the datacenter security tracker 610 of some embodiments may direct the LBC 115 to preferentially assign clients to other datacenters where the latest security patches have been applied. Avoiding the unpatched datacenters may have multiple advantages such as keeping the current clients safer while also reducing the load on the unpatched datacenters while administrators of those datacenters apply the patches or updates. Although the DNS cluster 600 of FIG. 6 sends security data directly from the datacenter security tracker 610 to the LBC 115, one of ordinary skill in the art will understand that, in some embodiments, the security data is sent to the LBC 115 from the DNS service engines instead of from the datacenter security tracker 610.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
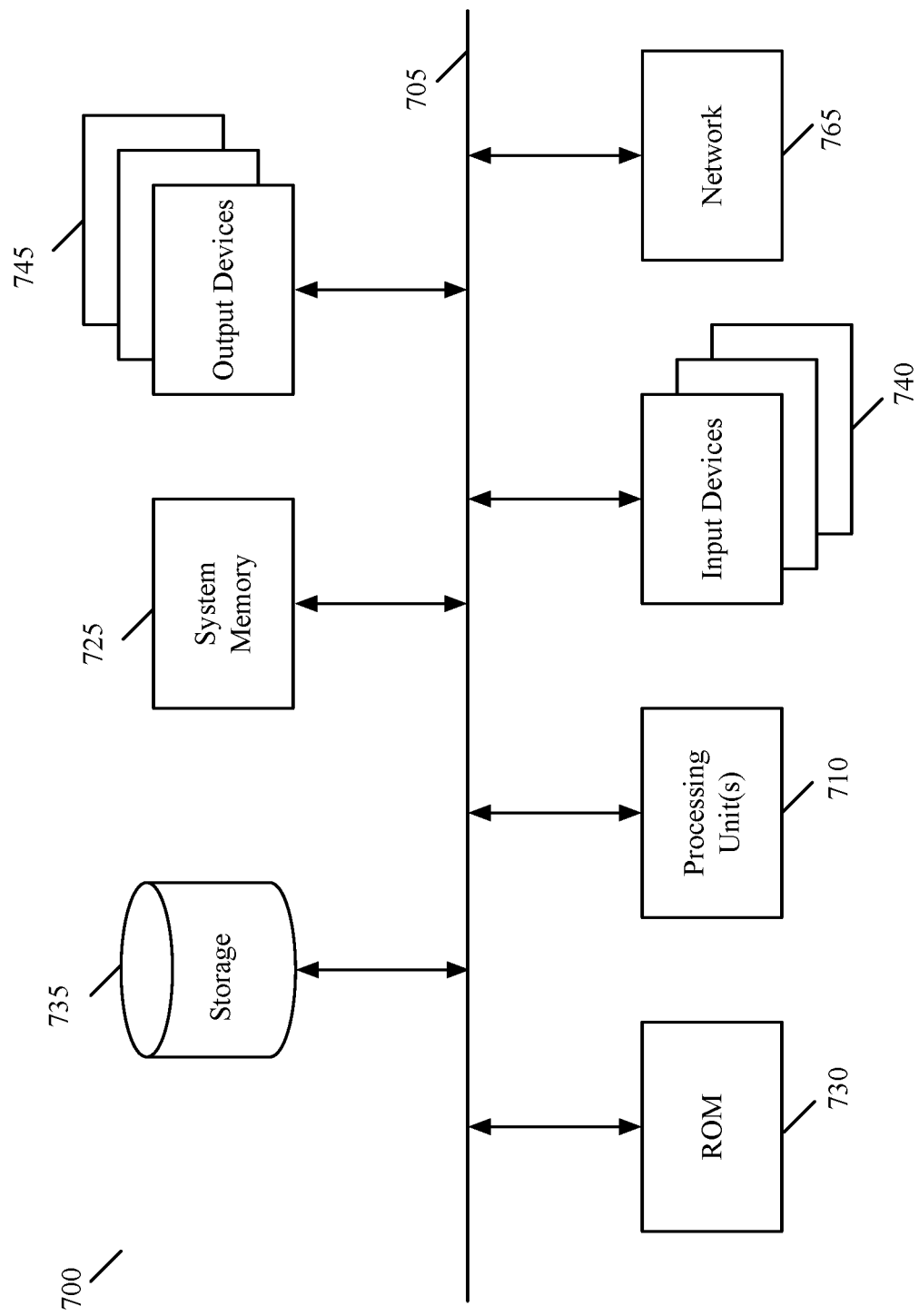
FIG. 7 conceptually illustrates a computer system with which some embodiments of the invention are implemented.

FIG. 7 conceptually illustrates a computer system 700 with which some embodiments of the invention are implemented. The computer system 700 can be used to implement any of the above-described hosts, controllers, gateway and edge forwarding elements. As such, it can be used to execute any of the above-described processes. This computer system 700 includes various types of non-transitory machine-readable media and interfaces for various other types of machine-readable media. Computer system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the computer system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments. The read-only-memory (ROM) 730 stores static data and instructions that are needed by the processing unit(s) 710 and other modules of the computer system. The permanent storage device 735, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device 735. Like the permanent storage device 735, the system memory 725 is a read-and-write memory device. However, unlike storage device 735, the system memory 725 is a volatile read-and-write memory, such as random access memory. The system memory 725 stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices 740 enable the user to communicate information and select commands to the computer system 700. The input devices 740 include alphanumeric keyboards and pointing devices (also called "cursor control devices"). The output devices 745 display images generated by the computer system 700. The output devices 745 include printers and display devices, such as cathode ray tubes (CRT) or liquid crystal displays (LCD). Some embodiments include devices such as touchscreens that function as both input and output devices 740 and 745.

Finally, as shown in FIG. 7, bus 705 also couples computer system 700 to a network 765 through a network adapter (not shown). In this manner, the computer 700 can be a part of a network of computers (such as a local area network ("LAN"), a wide area network ("WAN"), or an Intranet), or a network of networks (such as the Internet). Any or all components of computer system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments deploy gateways in public cloud datacenters. However, in other embodiments, the gateways are deployed in a third-party's private cloud datacenters (e.g., datacenters that the third-party uses to deploy cloud gateways for different entities in order to deploy virtual networks for these entities). Thus, one of ordinary skill in the art would understand that the invention is not to be limited by the foregoing illustrative details, but rather is to be defined by the appended claims.

The invention claimed is:

1. A method of assigning a client to a particular datacenter from a plurality of datacenters, the method comprising:
at a first datacenter:
receiving security data associated with a second datacenter, the security data being associated with one or more seriousness levels;
maintaining a deny list of client identifiers based on the received security data;
receiving a DNS request from the client;
checking a client identifier against the deny-list; and
based on the received security data and the client identifier, sending a DNS reply assigning the client to the particular datacenter instead of the second datacenter.

2. The method of claim 1, wherein the receiving and sending is performed by a DNS cluster of the datacenter.

3. The method of claim 1, wherein the particular datacenter includes a set of servers implementing an application for the client.

4. The method of claim 1, wherein the particular datacenter is the first datacenter.

5. The method of claim 1, wherein the particular datacenter is not the first datacenter.

6. The method of claim 1, wherein the security data is associated with a set of servers, at the second datacenter, that implement an application for clients.

7. The method of claim 6, wherein the security data is collected by hardware or software security agents at the second datacenter.

8. The method of claim 7, wherein the security agents are implemented on the servers of second datacenter.

9. The method of claim 7, wherein the security agents monitor security reports generated by smart network interface cards (smart NICs) in the second datacenter.

10. The method of claim 1, wherein the security data indicates a denial of service (DOS) attack.

11. The method of claim 1, wherein the security data indicates a compromised or less secure application at the second datacenter.

12. The method of claim 11, wherein the application is less secure not all available security patches have been applied to the application.

13. A non-transitory machine readable medium storing a program that when executed by at least one processing unit at a first datacenter assigns a client to a particular datacenter from a plurality of datacenters, the program comprising sets of instructions for:
receiving security data associated with a second datacenter, the security data being associated with one or more seriousness levels;
maintaining a deny list of client identifiers based on the received security data;
receiving a DNS request from the client;
checking a client identifier against the deny-list; and
based on the received security data and the client identifier, sending a DNS reply assigning the client to the particular datacenter instead of the second datacenter.

14. The non-transitory machine readable medium of claim 13, wherein the receiving and sending is performed by a DNS cluster of the datacenter.

15. The non-transitory machine readable medium of claim 13, wherein the particular datacenter includes a set of servers implementing an application for the client.

16. The non-transitory machine readable medium of claim 13, wherein the particular datacenter is the first datacenter.

17. The non-transitory machine readable medium of claim 13, wherein the particular datacenter is not the first datacenter.

18. The non-transitory machine readable medium of claim 13, wherein the security data is associated with a set of servers, at the second datacenter, that implement an application for clients.

19. The non-transitory machine readable medium of claim 18, wherein the security data is collected by hardware or software security agents at the second datacenter.

20. The non-transitory machine readable medium of claim 19, wherein the security agents monitor security reports generated by smart network interface cards (smart NICs) in the second datacenter.

* * * * *